F. HUOT.

Refining Petroleum.

No. 3,145. Reissued Oct. 6, 1868.

Witnesses
Chas. H. Smith
Geo. D. Walker

Inventor.
Henry Huot

UNITED STATES PATENT OFFICE.

FLEURY HUOT, OF NEW YORK, N. Y., ASSIGNEE, BY MESNE ASSIGNMENTS, OF HIMSELF.

IMPROVEMENT IN REFINING PETROLEUM.

Specification forming part of Letters Patent No. 63,051, dated March 19, 1867; antedated September 19, 1866; Reissue No. 3,145, dated October 6, 1868.

*To all whom it may concern:*

Be it known that I, FLEURY HUOT, of the city and State of New York, have invented, made, and applied to use a certain new and useful Improvement in Refining and Purifying Petroleum and other Liquids; and I do hereby declare the following to be a full, clear, and exact description, reference being had to the annexed drawings, making part of this specification, wherein—

Figure 2:
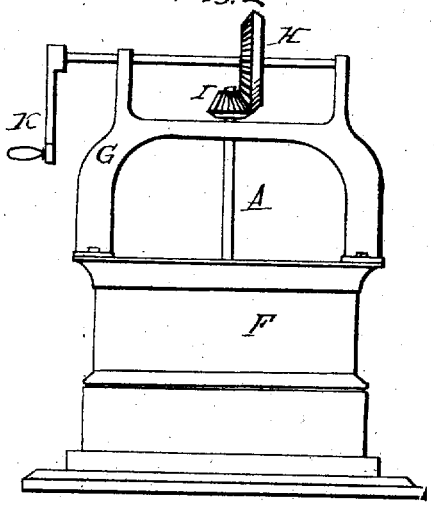
Figure 3:
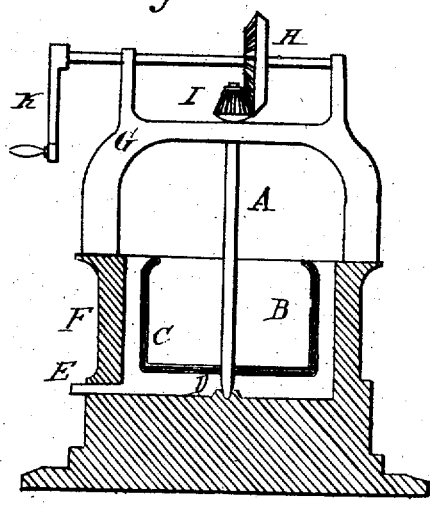
Figure 1:
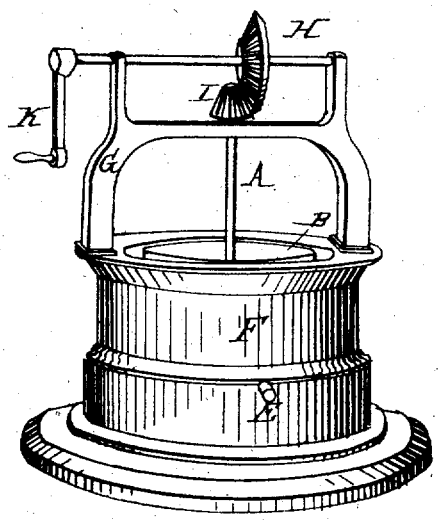

Figure 1 is a perspective view of the apparatus employed by me. Fig. 2 is an elevation thereof, and Fig. 3 is a vertical section of the same.

Similar marks of reference denote the same parts.

The object of my invention is to remove the coloring-matter and impurities from petroleum and other liquids, so as to render the same colorless and inodorous, or nearly so.

The nature of my said invention consists in the process of purifying petroleum and other liquids by mixing with the same animal charcoal, or similar carbonaceous matter, sufficient in quantity to absorb and retain the impurities to the desired extent, and then separating the liquid from such carbonaceous matter by a centrifugal filter that throws the liquid off and retains the carbonaceous matter and impurities. By this process the purifying and filtering operation is made uniform, whereas in other filtering operations the impurities are retained in the beginning, and the products are pure, and as the filtering medium becomes filled with impurities a portion passes through, rendering the filtration less perfect.

In the drawings I have shown a centrifugal filter. A is the shaft, sustained in the frame G at the top, and at the bottom the shaft sets in a step within the casing F. H is a gear-wheel rotated by the crank K or other competent power, and communicating a rapid rotation to the shaft A through the pinion I. Upon the shaft A is a cylindrical vessel, B, formed of wire grating, and containing within it a fine porous material that retains the carbon, but allows the liquid to pass off. I have shown a double bag of cotton or other material with sheets of filtering-paper between the two thicknesses of the bag. The double bags are shown at C by the black lines on each side of the red lines, which show the filtering-paper. The liquid and bone-black are supplied into this vessel B while the same is rotated with great velocity. The liquid is thrown off through the porous material into the chamber D, and runs away by the pipe E, the carbon with the impurities being retained and taken out from time to time as it accumulates.

What I claim, and desire to secure by Letters Patent, is—

1. The process herein set forth of purifying petroleum and other liquids by mixing with the same bone-black or other carbonaceous material, and then separating the said liquid from the carbonaceous substances by a centrifugal filter, substantially as and for the purposes set forth.

2. The centrifugal filter, formed of two thicknesses of cloth with an intervening layer of filtering-paper, as and for the purposes set forth.

In witness whereof I have hereunto set my signature this 20th day of January, A. D. 1868.

FLEURY HUOT.

Witnesses:

GEO. D. WALKER,
CHAS. H. SMITH.